United States Patent [19]
Roger

[11] 4,304,253
[45] Dec. 8, 1981

[54] ADJUSTABLE PRESSURE SENSING PISTON MECHANISM

[75] Inventor: Harry Roger, Lafayette, La.

[73] Assignee: J. Edwin Roy, Lafayette, La. ; a part interest

[21] Appl. No.: 126,691

[22] Filed: Mar. 3, 1980

Related U.S. Application Data

[63] Continuation-in-part of Ser. No. 63,081, Aug. 2, 1979, Pat. No. 4,258,741.

[51] Int. Cl.³ .................................. F16K 31/122
[52] U.S. Cl. .......................... 137/270; 137/625.66; 251/62; 92/62
[58] Field of Search ............... 137/269, 270, 625.66; 92/59, 62, 63; 91/54, 173; 251/62

[56] References Cited

U.S. PATENT DOCUMENTS 3,491,785  1/1970  Kay ............................... 92/62 X

Primary Examiner—Alan Cohan
Attorney, Agent, or Firm—Guy E. Matthews

[57] ABSTRACT

A housing/piston mechanism for sensing a control fluid pressure and shifting a valve element in response thereto. The piston mechanism comprises a first piston having an internal bore in which is positioned a second piston, and a third piston for use in one specific orientation within the piston housing. Varying ranges of fluid pressure sufficient to actuate the piston mechanism are accomplished by positioning the piston mechanism within its piston chamber in varying orientations so that the effective piston surface area exposed to a control fluid is dictated by the specific orientation of the piston mechanism within the chamber. In one orientation, the effective fluid pressure surface area is that of the larger piston member. In a second orientation, the effective surface area exposed to the sensing fluid is a first surface of the smaller piston carried by the larger piston. In a third orientation, the effective surface area exposed to the sensing fluid is that of the opposite end of the second piston. In a fourth orientation, the effective surface area exposed to the sensing fluid is that of the third piston.

To effect these various orientations of the piston mechanism, the piston orientation is reversed and O-rings relocated about the pistons, and in one orientation, a spacer is provided to cause the two pistons to shift simultaneously. In the fourth orientation, the third piston is used to engage the second piston to shift the valve element. In this manner, varying ranges of sensing fluid pressure sufficient to shift a pilot valve or other valve is accomplished with the use of a single spring within the valve to urge the valve element into position against the action of the sensing fluid pressure force.

25 Claims, 4 Drawing Figures

ADJUSTABLE PRESSURE SENSING PISTON MECHANISM

CROSS REFERENCE TO RELATED APPLICATION

This application is a continuation-in-part of application Ser. No. 63,081, filed Aug. 2, 1979 which is now U.S. Pat. No. 4,258,741.

FIELD OF THE INVENTION

This invention relates to an improvement in high-low pressure sensing pilot valves of the block and bleed type adapted to control the operation of motor valves and the like responsive to a control fluid pressure.

BACKGROUND OF THE INVENTION

Pilot valves of the block and bleed type commonly use a pressure balance spool valve which is shiftable, responsive to a change in a controlled, sensed pressure to apply or exhaust a control pressure to a motor valve, thereby controlling the latter. Thus the valve element is normally urged to one position by a spring whose force is opposed by the fluid pressure to be controlled acting on a piston to urge the valve element toward a second position. Pressure sensing valves of this type generally incorporate as part of the valve element, or separate from the valve element and engaging the valve element, a piston surface within a piston chamber and exposed to the sensing fluid pressure so that the area of the piston member determines the force at which a specified pressure will overcome the spring force opposing the fluid pressure to urge the valve element toward its second position. For a specified piston area pressure surface and a specified spring, a pressure sensor pilot valve has a specified range of pressure to which the "trip" pressure may be adjusted. In order to accommodate different values of pressure ranges, pilot valves incorporated the use of a number of springs of varying compression force and/or different piston and housing assemblies having varying piston surface areas. This practice necessitated interchanging these various springs and/or piston and housing assemblies to accommodate a certain specific range of "trip" pressure in order for the sensing pilot valve to function properly.

SUMMARY OF THE INVENTION

The present invention is directed toward a piston mechanism for use with a valve having a movable valve element therein. The piston mechanism comprises first, second and third piston members adapted to be positioned within a piston housing in different orientations so that different piston surface areas are exposed to a sensing fluid pressure to effect different ranges of sensing fluid pressure sufficient to urge the piston mechanism against the valve element to shift the element from one positon to another. The piston mechanism is reversable within the chamber so that, in different orientations of the piston mechanism within the chamber, different piston surface areas are exposed to the sensing fluid to determine the ranges of fluid pressure at which the valve element will shift.

It is an object of the present invention to provide a device for use with a valve having an operable valve element therein, such device having an internal pressure sensing piston means which is reversable within its piston chamber in order to provide different effective piston surface areas exposed to a sensing pressure port, thereby providing different ranges of sensing pressure to "trip" the valve, the valve utilizing only a single compression spring in opposition to the sensing fluid pressure.

DETAILED DESCRIPTION OF THE INVENTION

Figure 1:
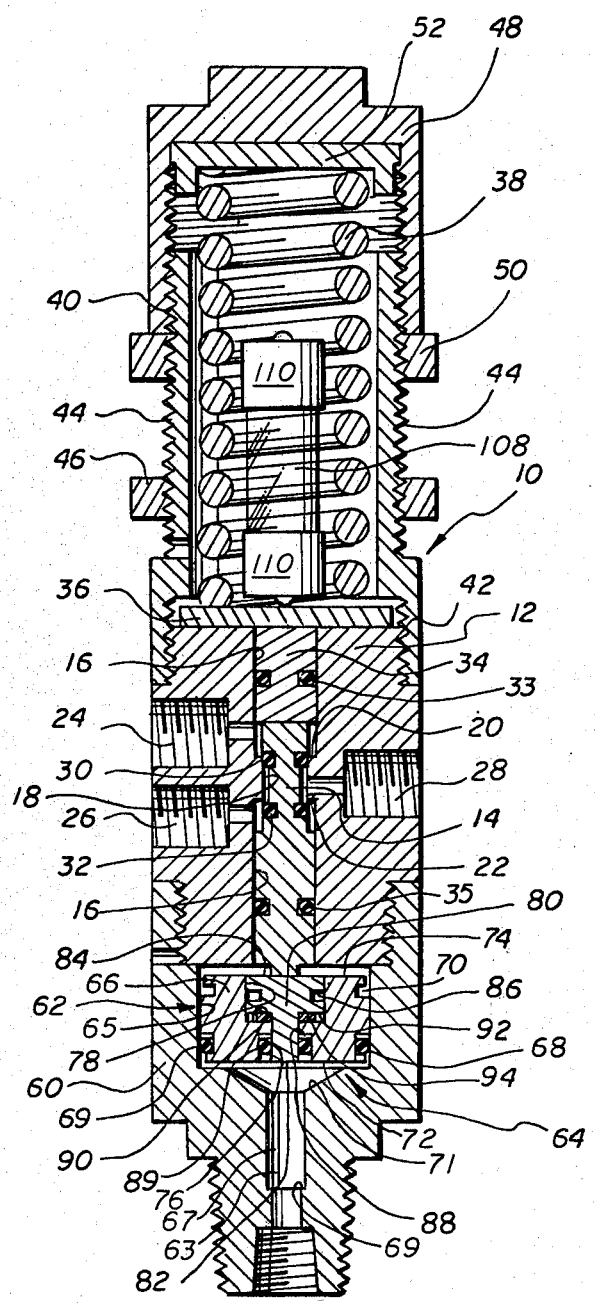
FIG. 1 is a vertical sectional view of a high-low pilot valve incorporating the present invention.

Turning now to the drawings, and more specificly to FIG. 1, a high-low pressure sensing pilot valve is shown generally illustrated by the numeral 10. The valve comprises a valve body 12 having an elongated bore 16 therethrough in which is positioned a valve element 14 operable to shift (vertically in the drawing) between two positions. The valve body 12 includes an intermediate bore 18 defining an upper annular surface 20 and lower annular surface 22, which annular surfaces are engaged by respective first and second O-rings 30 and 32 in order to provide a seal between the valve element 14 and intermediate bore 18 when the valve element is in either of its two positions. The valve body 12 includes first inlet port 24 communicating with the elongated bore 16 at a position above the intermediate bore 18, a second inlet port 26 communicating with the elongated bore at a position below the intermediate bore and an outlet port 28 communicating with the elongated bore at the location of the intermediate bore.

As best shown in FIG. 1, when the valve element 14 is in its "lower" position, the first or upper O-ring 30 engages the upper annular surface 20 to effect a seal therebetween, precluding communication between the first inlet port 24 and the outlet port 28. Similarly, when the valve element 14 is in its upper position, the second, or lower O-ring 32 engages the lower annular surface 22 to effect a seal therebetween, precluding communication between the second inlet port 26 and the outlet port 28. In each of the above instances, when communication is precluded between an inlet port and the outlet port, the valve element 14 is so positioned to permit communication between the other inlet port and the outlet port. Thus, with the valve element 14 in its upper position it "blocks" communication between the second inlet port 26 and the outlet port 28 as it "bleeds" any residual field pressure from the outlet port to the first inlet port. Similarly, with the valve element 14 in its lower position, it blocks communication between the first inlet port and the outlet port while it permits communication between the second inlet port 26 and outlet port in order to bleed any residual fluid pressure therein.

Fluid pressure within the area of the intermediate bore 18 is precluded from escaping from either end of the elongated bore 16 by operation of respective upper and lower O-rings 33 and 35. It can be appreciated that it would be impossible to install a valve element 14 of the particular design shown in the drawings within the elongated bore 16 and the intermediate bore 18 of the valve body 12. Therefore, the valve element 14 includes a separate elongated member 34 which is installed from above as the main valve element portion is installed from below. This elongated member 34 engages a pressure plate 36 positioned immediately above the valve body 12, which pressure plate in turn engages a compression spring 38 for providing a force urging the elongated member and valve element 14 downwardly toward its second position as shown in FIG. 1. The spring 38 is retained in compression by a spring housing 40 which is threadedly engaged to the valve body at 42. The spring housing 40 includes external threads 44 threadedly engaging an adjusting screw 48 at the upper end thereof for adjusting the compression force of the spring 38 against the pressure plate 36. The spring 38 is retained in axial alignment with the pressure plate 36 and adjusting screw 48 by an internal spring guide 52 positioned within the adjusting screw 48. Additionally, panel jam nut 46 is provided to retain the valve 10 securely in position within an operation panel, and adjusting screw jam nut 50 is provided to retain the adjusting screw 48 once positioned, to prevent same from loosing its pressure range adjustment in a vibration oriented environment.

The present invention is directed toward a piston mechanism for use with a valve having a movable valve element therein, as in the high-low pressure sensor pilot valve described hereinabove. The piston mechanism comprises a piston housing 60, including an internal piston chamber 62 and a sensing port 63 communicating with the piston chamber, as shown in FIG. 1. The piston chamber 62 comprises a first bore 65 and a second bore 67 communicating therewith. The second bore 67 communicates directly with the sensing port 63 to define an annular ledge surface 69 to function as described hereinbelow. The housing 60 includes a tapered annular surface 71 interconnecting the first and second bore 65 and 67, respectively, the function thereof also to be described hereinbelow.

A piston means 64 is positioned within the piston chamber 62 and comprises a first piston 66, a second piston 80, and a third piston 96, used in one of the piston means orientations, to be described hereinbelow. The first piston 66 includes respective first and second O-ring channels 68 and 70, one of such channels, depending on the orientation of the first piston member within the piston chamber 62, carrying an O-ring 69. The first piston 66 includes a first surface 72 and a second surface 74 opposite therefrom, which first surface is the effective "pressure surface" of the piston means 64 when the piston means is oriented as shown in FIG. 1.

The first piston 66 includes a first internal bore 76 concentric with the outer cylindrical surface thereof, and also includes a second concentric bore 78 terminating in an annular surface 90, which surface engages a mating surface of the second piston 80 as described hereinbelow.

Figure 2:
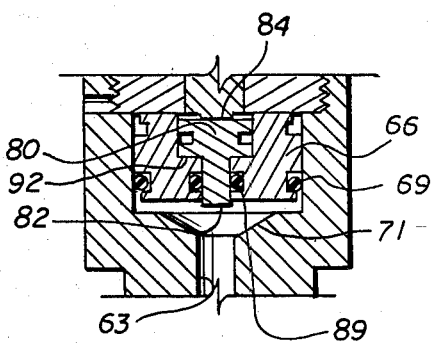
FIG. 2 is a partial vertical section view of the present invention shown in a second functional mode.
Figure 3:
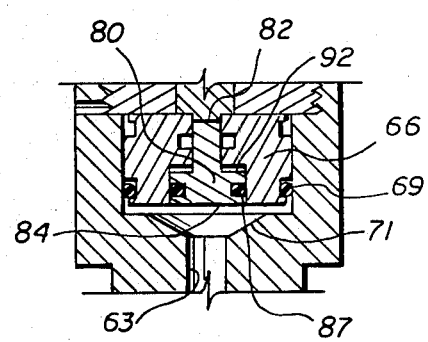
FIG. 3 is a partial vertical sectional view of the present invention shown in a third functional mode.

The second piston 80 includes a first diameter defining a first piston surface 82 and a second diameter defining a second piston surface 84 at the opposite end thereof. These two diameter surfaces define a second piston annular surface 92 for engaging a mating first piston annular surface 90 when the piston means is oriented as shown in FIG. 2. The second piston 80 includes an O-ring channel 86 which carries an O-ring 87 when the piston means 64 is oriented as shown in FIG. 3. The first piston 66 also includes a third O-ring channel 88 which carries a third O-ring 89 when the piston means 64 is positioned as shown in FIG. 1 or FIG. 2.

The piston means 64 also includes an optional annular spacer 94 positioned between the mating annular 90 and 92 of respective first and second pistons 66 and 80, when in the first functional mode as shown in FIG. 1, for causing the second piston to engage and actuate the valve element 14 in response to sufficient fluid pressure applied to the sensing port 63, as will be described hereinbelow.

Figure 4:
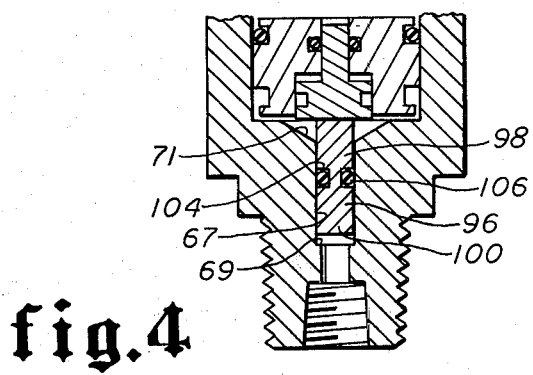
FIG. 4 is a partial vertical sectional view of the present invention shown in a fourth functional mode.

As shown in FIG. 4, the third piston 96 is shown positioned in the second internal piston bore 67. The third piston 96 comprises first and second end sections 98 and 100 respectively and a third interconnecting section 102 defining an O-ring channel 104 which carries O-ring 106.

The third piston 96 is inserted into the second internal piston bore 67 from the top as piston means 64 is assembled and prepared for mounting with the valve body 12. The tapered annular surface 71 aids in minimizing the damage to O-ring 106 by forming a funnel leading into the second bore 67 which serves to reduce the sharpness of the annular edge formed by the union of the annular tapered surface 71 and the housing second bore 67. Also the tapered surface 71 aids in gradually compressing O-ring 106 to "funnel" the O-ring into bore 67 as the third piston 96 is inserted thereinto. The third piston 96 is retained in position by annular surface 69 located at the lower end of the second internal piston bore 67 at its union with the sensing port 63.

Briefly, the operation of the high-low pressure sensor pilot valve is as follows: if the pilot is to act as a high pressure sensor and is to block flow to a controlled valve responsive to the occurence of a high control pressure applied to the sensing port 63, control fluid is piped to the second inlet port 26 and the first inlet port 24 is open to the atmosphere or equivalent. However, when the pilot valve is to act as a low pressure sensor and is to block flow to the controlled valve responsive to the occurence of a low pressure in the sensing port 63, the control fluid is piped to the first inlet port 24 and the second inlet port 26 is open to the atmosphere or equivalent. Thus, the pilot will block flow to the controlled valve while bleeding the pressure from the latter responsive to the occurence of a predetermined high or low pressure depending on the piping to inlet ports 24 and 26.

In the event it is desired to alter the ranges of fluid pressure that will shift the valve element 14 from its first position to its second position against the opposition of spring 38, the piston means 64 may be positioned in one of four orientations within the piston chamber 62 to accomplish the desired changes.

As may be understood from a study of FIG. 2, fluid pressure at sensing port 63 is exposed to the entire surface area of the first piston and the second piston first, or smaller, surface 82. As pressure to port 63 increases, the first piston, having the larger surface area exposed to such fluid pressure, is urged upwardly to engage the bottom end surface of valve body 12. However, a much larger fluid pressure acting upon the second piston smaller surface 82 is required before the second piston 80 will shift upwardly in opposition to the spring 38. Therefore, in this orientation, the force required to actuate the valve element 14 is that acting on the effective piston surface area exposed to the sensing port 63, the area of the second piston first surface 82.

A second orientation of the piston means 64 within the piston chamber 62 is shown in FIG. 1. The orientation of respective pistons 66 and 80 is the same with respect to their piston surfaces exposed to fluid sensing port 63. In this orientation, however, the piston means 64 includes an optional annular spacer 94 positioned between respective first and second piston mating annular surfaces 90 and 92. The function of this spacer 94 is to cause the second piston 80 to shift upperwardly with the first piston 64 so that, as the first piston shifts upperwardly in response to a lower fluid pressure applied at port 63, the second piston 80 is carried therewith and caused to engage valve element 14 to shift same from its lower position to its upper position against the urging of spring 38. In this orientation, the effective fluid pressure area exposed to the sensing port 63 is that of the first piston 64, a larger piston surface area, requiring a lower fluid pressure to shift the valve element 14 against a set force provided by the spring 38.

A third orientation of the piston means 64 within the piston chamber 62 is shown in FIG. 3, wherein the spacer 94 has been removed and both piston members 66 and 80 are reversed from that of first two orientations described immediately hereinabove. Also in this third orientation, O-ring 69 has been moved from channel 68 to channel 70, O-ring 89 has been removed and new O-ring 87 has been installed in the second piston member second diameter O-ring channel 86 so that the effective fluid pressure area exposed to the sensing port 63 to effect a shift of valve element 14 is that of the second piston second surface 84. In this orientation, as in that of FIG. 2, fluid pressure applied to sensing port 63 will first shift the first piston 66 in an upward direction to engage the lower surface of the valve body 12. Also, as in the orientation shown in FIG. 2, this shifting of the first piston 66 has no effect on the movement of the valve element 14 within the valve body 12. Spring 38 continues to urge the valve element downwardly into engagement with the second piston first surface 82 to hold the second piston 80 in position as shown in FIG. 3. At this point, sufficient fluid pressure at port 63 acts against surface 84 to shift the second piston 80 upwardly to engage and shift valve element 14 to its upper position against the urging of spring 38. In this orientation, the second piston 80 is solely responsible for shifting the valve element 14 upperwardly; therefore, the effective fluid pressure area exposed to the sensing port 63 is that of the second piston second surface 84.

A fourth orientation of piston means 64 within the piston housing 60 is shown in FIG. 4. In this orientation, the first and second pistons are oriented as in the third mode (FIG. 3), with the third piston 96 and accompanying O-ring 106 positioned within the second internal piston bore 67. In this orientation, O-ring 87 has been removed from O-ring channel 86 and O-ring 89 is installed within O-ring channel 88 to maintain the fluid separation between a sensing port 63 and the elongated bore 16 of the valve 10. In this orientation, the effective fluid pressure area exposed to the sensing port 63 to effect a shift of valve element 14 is that of the surface of the third piston 96 exposed to the sensing port 63. With O-ring 106 in place, fluid at sensing port 63 is precluded from entering the piston chamber 62 to act on either the first piston 66 or the second piston 80 to shift the valve element 14. Only when the pilot fluid pressure acting on the smaller, outer surface of the third piston 96 reaches sufficient magnitude to overcome the force exerted by the spring 38 with the third piston shift upwardly to engage the second piston 80, which in turn engages the valve element 14 to shift the valve element to its upper position against the force of spring 38 urging the valve element downwardly.

The piston mechanism of the present invention is adapted to provide four different ranges of fluid pressure sufficient to shift valve element 14 from its lower position to its upper position in opposition to a single spring having a specific compression range determined by the location of the adjusting screw 48 upon the spring housing 40. It is therefore adapted to be fully functional over a wide range of sensing fluid pressures. When used with a single spring, the varying ranges of fluid pressure sufficient to actuate the valve element 14 are dictated by the orientation of the piston means 64 within the piston chamber 62, and hence, the particular effective fluid pressure area thereof exposed to the sensing port 63.

Obviously, not all of the various pistons, O-rings and spacer are used in each of the four orientations of the piston means 64 within the housing. However, in keeping with the scope of the present invention, a complete kit of component parts, comprising the pistons 66, 80 and 96, annular spacer 94, and associated O-rings, is supplied. Necessarily, extra parts not in use in a particular application of the present invention will need to be kept with the valve, etc., operated by the piston mechanism of the present invention. Therefore, means are provided for storing these extra parts within the cavity defined by the interior of the valve spring 38. This storing means comprises a cylindrical hollow tube 108, open at at least one end thereof, and at least one end cap 110 for retaining the extra parts therein.

When the pressure range desired is determined, the piston means 64 is assembled accordingly and positioned within the housing 60 as shown in the drawings. The extra parts are placed into the tube 108, the cap 110 attached thereto, and the sealed tube positioned within the valve spring 38, as shown.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a valve having a body and operable valve element therein, the improvement comprising a device mounted therewith for actuating said valve element, comprising:

(a) a housing having a first bore exposed to said valve element and a second bore communicating with said first bore and a sensing port communicating with said second bore; and (b) piston means slidable within said housing and exposed to said sensing port for actuating said valve element in response to sufficient fluid pressure applied to said sensing port, said piston means comprising:

(1) a first piston slidable within said first bore and having a piston bore therethrough; and (2) a second piston slidable within said piston bore for engaging said valve element for shifting said valve element from a first to a second position in response to said fluid pressure;

wherein said piston means is positionable within said housing first bore in
- (a) a first orientation wherein the effective fluid pressure area thereof exposed to said sensing port is the cross-sectional area of said second piston, and
- (b) a second orientation wherein the effective fluid pressure area thereof exposed to said sensing port is the cross-sectional area of said first piston.

2. The device as set forth in claim 1, wherein the opposite end of said second piston comprises a surface having a third cross-sectional area, and wherein said piston means is positionable within said housing in a third orientation wherein the effective fluid pressure area thereof exposed to said sensing port is said third cross-sectional area of said second piston.

3. The device as set forth in claim 1, wherein said piston means further comprises locking means for removably attaching said first and second pistons together in sliding relation within said housing first bore.

4. The device as set forth in claim 3, wherein said locking means comprises a spacer mounted with said first and second piston for causing said second piston to actuate said valve element in response to sufficient fluid pressure applied to said first piston.

5. The device as set forth in claim 2, wherein said piston means further comprises a third piston slidable within said housing second bore for engaging said second piston, and wherein said piston means is positionable within said housing in a fourth orientation wherein the effective fluid pressure area thereof exposed to said sensing port is the cross-sectional area of said third piston.

6. A device for use with a valve having a body and operable valve element therein and for actuating said valve element, said device comprising:
- (a) a housing having a first bore exposed to said valve element and a second bore communicating with said first bore and a sensing port communicating with said second bore; and
- (b) piston means slidable within said housing and exposed to said sensing port for actuating said valve element in response to sufficient fluid pressure applied to said sensing port, said piston means comprising:
  - (1) a first piston slidable within said first bore and having a piston bore therethrough; and
  - (2) a second piston slidable within said piston bore for engaging said valve element from a first to a second position in response to said fluid pressure;

wherein said piston means is positionable within said housing first bore in
- (a) a first orientation wherein the effective fluid pressure area thereof exposed to said sensing port is the cross-sectional area of said second piston, and
- (b) a second orientation wherein the effective fluid pressure area thereof exposed to said sensing port is the cross-sectional area of said first piston.

7. The device as set forth in claim 6, wherein the opposite end of said second piston comprises a surface having a third cross-sectional area, and wherein said piston means is positionable within said housing in a third orientation wherein the effective fluid pressure area thereof exposed to said sensing port is said third cross-sectional area of said second piston.

8. The device as set forth in claim 6, wherein said piston means further comprises locking means for removably attaching said first and second pistons together in sliding relation within said housing first bore.

9. The device as set forth in claim 8, wherein said locking means comprises a spacer mounted with said first and second piston for causing said second piston to actuate said valve element in response to sufficient fluid pressure applied to said first piston.

10. The device as set forth in claim 7, wherein said piston means further comprises a third piston slidable within said housing second bore for engaging said second piston, and wherein said piston means is positionable within said housing in a fourth orientation wherein the effective fluid pressure area thereof exposed to said sensing port is the cross-sectional area of said third piston.

11. A kit having component parts adapted to be assembled together for use with a valve having a body and operable valve element therein for actuating said valve element said kit comprising the combination of:
- (a) a housing having a first bore exposed to said valve element and a second bore communicating with first bore and a sensing port communicating with said second bore; and
- (b) piston means slidable within said housing and exposed to said sensing port for actuating said valve element in response to sufficient fluid pressure applied to said sensing port, said piston means comprising:
  - (1) a first piston slidable within said first bore and having a piston bore therethrough; and
  - (2) a second piston slidable within said piston bore for engaging said valve element for shifting said valve element from a first to a second position in response to said fluid pressure;

wherein said piston means is positionable within said housing first bore in
- (a) a first orientation wherein the effective fluid pressure area thereof exposed to said sensing port is the cross-sectional area of said second piston, and
- (b) a second orientation wherein the effective fluid pressure area thereof exposed to said sensing port is the cross-sectional area of said first piston.

12. The kit as set forth in claim 11, wherein the opposite end of said second piston comrises a surface having a third cross-sectional area, and wherein said piston means is positionable within said housing in a third orientation wherein the effective fluid pressure area thereof exposed to said sensing port is said third cross-sectional area of said second piston.

13. The kit as set forth in claim 11, wherein said piston means further comprises locking means for removably attaching said first and second pistons together in sliding relation within said housing first bore.

14. The kit as set forth in claim 13, wherein said locking means comprises a spacer mounted with said first and second piston for causing said second piston to actuate said valve element in response to sufficient fluid pressure applied to said first piston.

15. The kit as set forth in claim 12, wherein said piston means further comprises a third piston slidable within said housing second bore for engaging said second piston, and wherein said piston means is positionable within said housing in a fourth orientation wherein the effective fluid pressure area thereof exposed to said sensing port is the cross-sectional area of said third piston.

16. In a pilot valve comprising:
 (a) a valve body, having:
  (1) an elongated bore therein,
  (2) a fluid inlet port communicating with said bore,
  (3) an outlet port communicating with said bore, and
  (4) a sensing port communicating with said bore;
 (b) a valve element slidable within said bore for regulating the flow of fluid through said pilot valve, said valve element being shiftable between a first position and a second position;
 (c) means for urging said valve element into its first position, the improvement comprising a device mounted therewith for actuating said valve element, comprising:
  (a) a housing having a first bore exposed to said valve element and a second bore communicating with said first bore and a sensing port communicating with said second bore; and
  (b) piston means slidable within said housing and exposed to said sensing port for actuating said valve element in response to sufficient fluid pressure applied to said sensing port, said piston means comprising:
   (1) a first piston slidable within said first bore and having a piston bore therethrough; and
   (2) a second piston slidable within said piston bore for engaging said valve element for shifting said valve element from a first to a second position in response to said fluid pressure
wherein said piston means is positionable within said housing first bore in
 (a) a first orientation wherein the effective fluid pressure area thereof exposed to said sensing port is the cross-sectional area of said second piston, and
 (b) a second orientation wherein the effective fluid pressure area thereof exposed to said sensing port is the cross-sectional area of said first piston.

17. The device as set forth in claim 16, wherein the opposite end of said second piston comprises a surface having a third cross-sectional area, and wherein said piston means is positionable within said housing in a third orientation wherein the effective fluid pressure area thereof exposed to said sensing port is said third cross-sectional area of said second piston.

18. The device as set forth in claim 16, wherein said piston means further comprises locking means for removably attaching said first and second pistons together in sliding relation within said housing first bore.

19. The device as set forth in claim 18, wherein said locking means comprises a spacer mounted with said first and second piston for causing said second piston to actuate said valve element in response to sufficient fluid pressure applied to said first piston.

20. The device as set forth in claim 17, wherein said piston means further comprises a third piston slidable within said housing second bore for engaging said second piston, and wherein said piston means is positionable within said housing in a fourth orientation wherein the effective fluid pressure area thereof exposed to said sensing port is the cross-sectional area of said third piston.

21. A pilot valve comprising:
 (a) a valve body, having:
  (1) an elongated bore therein;
  (2) a fluid inlet port communicating with said bore;
  (3) an outlet port communicating with said bore,
  (4) a piston chamber communicating with said bore, and
  (5) a sensing a port communicating with said piston chamber;
 (b) a valve element slidable within said bore for regulating the flow of fluid through said bore, said valve element having shiftable between a first position and a second position;
 (c) means for urging said valve element into its first position; and
 (d) a device mounted therewith for actuating said valve element, comprising:
  (1) a housing having a first bore exposed to said valve element and a second bore communicating with said first bore and a sensing port communicating with said second bore; and
  (2) piston means slidable within said housing and exposed to said sensing port for actuating said valve element in response to sufficient fluid pressure applied to said sensing port, said piston means comprising:
   (i) a first piston slidable within said first bore and having piston bore therethrough; and
   (ii) a second piston slidable within said piston bore for engaging said valve element for shifting said valve element from a first to a second position in response to said fluid pressure
wherein said piston means is positionable within said housing first bore in:
 (a) a first orientation wherein the effective fluid pressure area thereof exposed to said sensing port is the cross-sectional area of said secon piston, and
 (b) a second orientation wherein the effective fluid pressure area thereof exposed to said sensing port is the cross-sectional area of said first piston.

22. The device as set forth in claim 21, wherein the opposite end of said second piston comprises a surface having a third cross-sectional area, and wherein said piston means is positionable within said housing in a third orientation wherein the effective fluid pressure area thereof exposed to said sensing port is said third cross-sectional area of said second piston.

23. The device as set forth in claim 21, wherein said piston means further comprises locking means for removably attaching said first and second pistons together in sliding relation within said housing first bore.

24. The device as set forth in claim 23, wherein said locking means comprises a spacer mounted with said first and second piston for causing said second piston to actuate said valve element in response to sufficient fluid pressure applied to said first piston.

25. The device as set forth in claim 22, wherein said piston means further comprises a third piston slidable within said housing second bore for engaging said second piston, and wherein said piston means is positionable within said housing in a fourth orientation wherein the effective fluid pressure area thereof exposed to said sensing port is the cross-sectional area of said third piston.

* * * * *